(12) United States Patent
Yamashita et al.

(10) Patent No.: US 8,360,677 B2
(45) Date of Patent: Jan. 29, 2013

(54) HYDRAULIC DETACHABLE COUPLING

(75) Inventors: Shoki Yamashita, Takasago (JP); Tadao Yashiki, Takasago (JP); Taku Ichiryu, Akashi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 124 days.

(21) Appl. No.: 12/304,844

(22) PCT Filed: Feb. 21, 2007

(86) PCT No.: PCT/JP2007/053133
§ 371 (c)(1), (2), (4) Date: Apr. 7, 2009

(87) PCT Pub. No.: WO2008/010326
PCT Pub. Date: Jan. 24, 2008

(65) Prior Publication Data
US 2009/0324323 A1 Dec. 31, 2009

(30) Foreign Application Priority Data
Jul. 18, 2006 (JP) ................ 2006-195204

(51) Int. Cl.
*B25G 3/28* (2006.01)
(52) U.S. Cl. .................. 403/359.6; 403/359.1
(58) Field of Classification Search .......... 403/355, 403/356, 358, 59.1, 359.5, 359.63, 359.1, 403/359.6, 359.2, 383; 29/525
See application file for complete search history.

(56) References Cited

U.S. PATENT DOCUMENTS 2,560,958 A 7/1951 King
2,899,222 A 8/1959 Ross
3,104,459 A * 9/1963 Wendt ............... 29/252
4,417,855 A 11/1983 Jepsen
(Continued)

FOREIGN PATENT DOCUMENTS
GB 2310026 A 8/1997
JP 52-60571 U 5/1977
(Continued)

OTHER PUBLICATIONS

European Search Report date Dec. 29, 2009, issued in corresponding European Patent Application No. 07714633.0.

(Continued)

*Primary Examiner* — Victor MacArthur
*Assistant Examiner* — Daniel Wiley
(74) *Attorney, Agent, or Firm* — Westerman, Hattori, Daniels & Adrian, LLP

(57) ABSTRACT

A hydraulic detachable coupling, which can transmit rated torque in a manner stable to vibrations, and can fully withstand abnormal torque. For this purpose, in a hydraulic detachable coupling (4) mounted detachably on a rotor (1) of a steam or gas turbine or other machine, a coupling sleeve (4b), which is fitted on a shaft end portion of a casing penetrating shaft (2) in the rotor (1), includes a taper hole portion (4b-a) which is interference-fitted on a taper shaft portion (2a) of the shaft end portion by a hydraulic pressure, and a straight hole portion (4b-b) having teeth (13) engaging a plurality of teeth (12) formed in a straight shaft portion (2b) of the shaft end portion, the taper hole portion (4b-a) and the straight hole portion (4b-b) being located adjacent to each other.

3 Claims, 15 Drawing Sheets

U.S. PATENT DOCUMENTS

| | | | |
|---|---|---|---|
| 4,456,396 A | | 6/1984 | Damratowski |
| 4,702,636 A | * | 10/1987 | Guile ............................ 403/24 |
| 5,674,026 A | * | 10/1997 | Ishibashi et al. ........... 403/359.5 |
| 6,368,225 B1 | * | 4/2002 | Breese et al. ................. 464/183 |

FOREIGN PATENT DOCUMENTS

| | | |
|---|---|---|
| JP | 54-25362 A | 2/1979 |
| JP | 56-89030 U | 7/1981 |
| JP | 61-205260 U | 12/1986 |
| JP | 5-126116 A | 5/1993 |
| JP | 5-280546 A | 10/1993 |
| JP | 6-10631 U | 2/1994 |
| JP | 6-49828 A | 7/1994 |
| JP | 7-35150 A | 2/1995 |
| JP | 10-37968 A | 2/1998 |
| JP | 11-153009 A | 6/1999 |
| JP | 2001-82497 A | 3/2001 |
| JP | 2002-147497 A | 5/2002 |
| JP | 2003-65006 A | 3/2003 |

OTHER PUBLICATIONS

International Search Report of PCT/JP2007/053133, date of mailing Mar. 27, 2007.

Japanese Office Action dated Jan. 24, 2012 (mailing date), issued in corresponding Japanese Patent Application No. 2006-195204 with an English language translation.

Non-Final Office Action dated Dec. 23, 2011, issued in corresponding U.S. Appl. No. 13/231,071.

Final Office Action dated Jul. 20, 2012, issued in corresponding U.S. Appl. No. 13/231,071 (16 pages).

Notice of Allowance dated Jul. 31, 2012, issued in corresponding Japanese Patent Application No. 2006-195204, with English translation (5 pages).

* cited by examiner

HYDRAULIC DETACHABLE COUPLING

TECHNICAL FIELD

This invention relates to a hydraulic detachable coupling preferred for use in a rotor of a rotating machine such as an electric generator, a steam turbine, a gas turbine, or a compressor.

BACKGROUND ART

Generally, rotors of an electric generator, a steam turbine, a gas turbine, or a compressor, for example, are coupled coaxially by a rotor coupling (see Patent Document 1).

In the steam or gas turbine, gas seals (called mechanical seals) 101 may be installed at portions of a rotor 100 which penetrate a turbine casing, as shown in FIG. 15. These are 360° circular (endless) components fitted from the shaft ends of the rotor 100. The gas seal 101 needs to be periodically detached and attached for maintenance and checkup.

To enable the gas seal 101 to be detached and attached, therefore, a rotor coupling 102A, which is installed at the shaft end of the rotor 100, is also designed to be capable of easy removal and reassembly. In the illustrated example, for instance, a coupling sleeve 102a of the rotor coupling 102A is increased in diameter by application of a hydraulic pressure (see hydraulic paths 103 in the drawing), and then the hydraulic pressure is released, whereby the coupling sleeve 102a is interference-fitted (hydraulically fitted) to the shaft end of the rotor 100. From this state, on the other hand, a hydraulic pressure is applied again to increase the diameter of the coupling sleeve 102a, whereby the rotor coupling 102A can be removed from the shaft end of the rotor 100.

As shown in FIG. 16, moreover, there is a case in which an involute spline tooth portion 104a cut in the outer periphery of the shaft end of a rotor 100, and an involute spline groove portion 104b cut in the inner periphery of a coupling sleeve 102b of a rotor coupling 102B are brought into splined engagement with each other, and prevented by a press nut 105 from disengagement.

Patent Document 1: JP-A-2003-65006

DISCLOSURE OF THE INVENTION

Problems to be Solved by the Invention

With the rotor coupling 102A as shown in FIG. 15, rated torque in a shafting for driving the electric generator can be stably transmitted by a frictional force attributed to the interference fit. However, there has been the problem that the rotor coupling 102A cannot withstand abnormal torque (usually, 5 to 10 times the rated torque) occurring in a short-circuit accident or asynchronous input which is a special accident of the electric circuit of the electric generator. That is, during the occurrence of abnormal torque, slip occurs at the surface of pressure contact between the outer peripheral surface of the shaft end of the rotor 100 and the inner peripheral surface of the coupling sleeve 102a, thereby inducing excessive vibration or damage.

The rotor coupling 102B as shown in FIG. 16, on the other hand, can withstand abnormal torque because of its splined engagement, and can be easily attached and detached. However, if the rotor 100 has a shaft with a very large overall length (for example, exceeding 7 meters), as in an upsized steam or gas turbine or compressor, the rotor coupling 102B has presented the problem that cutting of a spline, such as the spline tooth portion 104a or the spline groove portion 104b (by a gear cutting machine), in the shaft end is difficult from the viewpoint of equipment.

The present invention has been accomplished in the light of the above-described situations. It is an object of the invention to provide a hydraulic detachable coupling which can transmit rated torque in a manner stable to vibrations, and can fully withstand abnormal torque.

Means for Solving the Problems

A hydraulic detachable coupling according to the present invention, intended for attaining the above object, is a hydraulic detachable coupling mounted detachably on a rotating shaft of a rotating machine, comprising: a coupling sleeve which is fitted on a shaft end portion of the rotating shaft, the coupling sleeve including an interference fit portion which is interference-fitted on an outer peripheral surface of the shaft end portion by a hydraulic pressure, and an engagement portion which engages the outer peripheral surface of the shaft end portion at a plurality of locations in a circumferential direction, the interference fit portion and the engagement portion being located adjacent to each other.

The hydraulic detachable coupling is characterized in that the interference fit portion is a taper hole portion corresponding to a tapering-off taper shaft portion of the shaft end portion.

The hydraulic detachable coupling is also characterized in that the engagement portion is a straight hole portion having teeth formed therein, the teeth engaging teeth formed in a straight shaft portion of the shaft end portion.

The hydraulic detachable coupling is also characterized in that the teeth of the engagement portion, except for one of the teeth of the engagement portion making high accuracy engagement without clearance, engage a plurality of the teeth of the shaft end portion via taper spacers disposed on both sides of other of the teeth of the engagement portion.

The hydraulic detachable coupling is also characterized in that the engagement portion is a straight hole portion having keyways formed therein, the keyways corresponding to a plurality of keyways formed in a straight shaft portion of the shaft end portion.

The hydraulic detachable coupling is also characterized in that one of the corresponding keyways is a groove of a rectangular cross section into which a square key is inserted, and other of the corresponding keyways are taper grooves of a semicircular cross section into which round taper keys are inserted.

The hydraulic detachable coupling is also characterized in that the coupling sleeve is prevented from slipping off the rotating shaft, by slipping-off preventing means secured to the shaft end portion.

Effects of the Invention

According to the features of the present invention, the interference fit portion by the hydraulic pressure can stably transmit rated torque while maintaining satisfactory shaft vibration characteristics, whereas the engagement portion can sufficiently deal with abnormal torque. As a result, a hydraulic detachable coupling having high durability and involving low vibration can be realized.

DESCRIPTION OF THE NUMERALS

Figure 1:
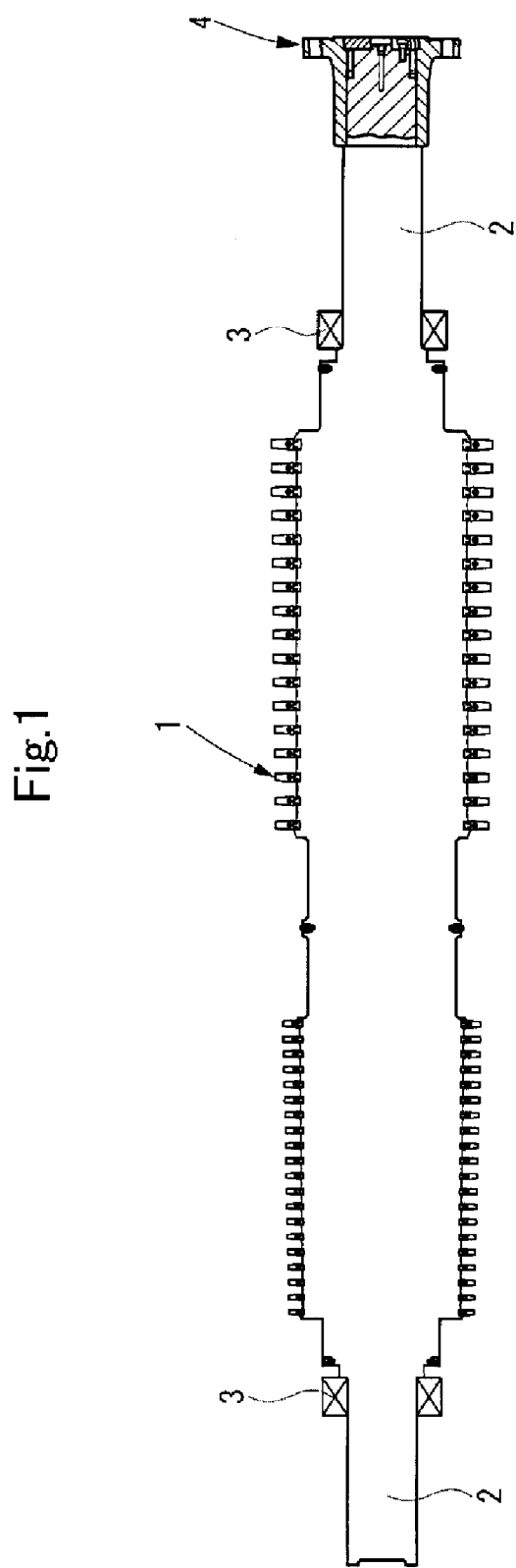
FIG. 1 is a side view of a rotor and a coupling showing Embodiment 1 of the present invention.

1 Rotor
2 Casing penetrating shaft
2a Taper shaft portion
2b Straight shaft portion
3 Gas seal
4 Rotor coupling
4a Coupling flange
4b Coupling sleeve
4b-a Taper hole portion
4b-b Straight hole portion
5 Rotor
6 Spacer
7 bolt
8 Spiral groove
9a, 9b Hydraulic path
10a, 10b O ring
11 Residual oil blowing hole
12, 12A, 12B Tooth
13, 13A, 13B Tooth
14 Taper spacer
15 Press plate
16 Clamping bolt
17 Spacer hold-down screw
18 Press nut
19 Whirl-stop washer
20 Bolt
21 Coned disk spring
22 Liner
23 Square key
24 Round taper key
25, 26 Groove of rectangular cross section
28a, 28b Taper groove of semicircular cross section
29 Key hold-down screw
30 Screw hole

BEST MODE FOR CARRYING OUT THE INVENTION

A hydraulic detachable coupling according to the present invention will now be described in detail by embodiments using the accompanying drawings.

Embodiment 1

Figure 2:
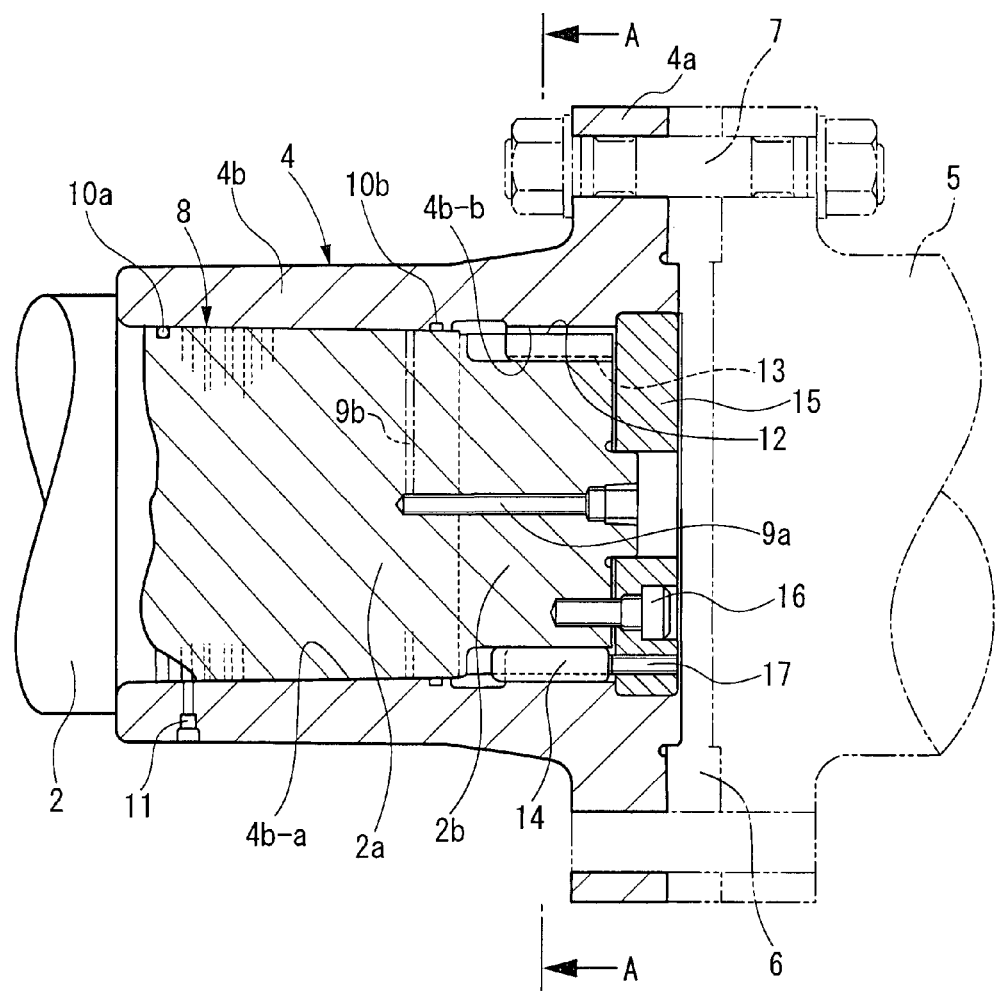
FIG. 2 is an enlarged sectional view of a coupling portion in FIG. 1.
Figure 3:
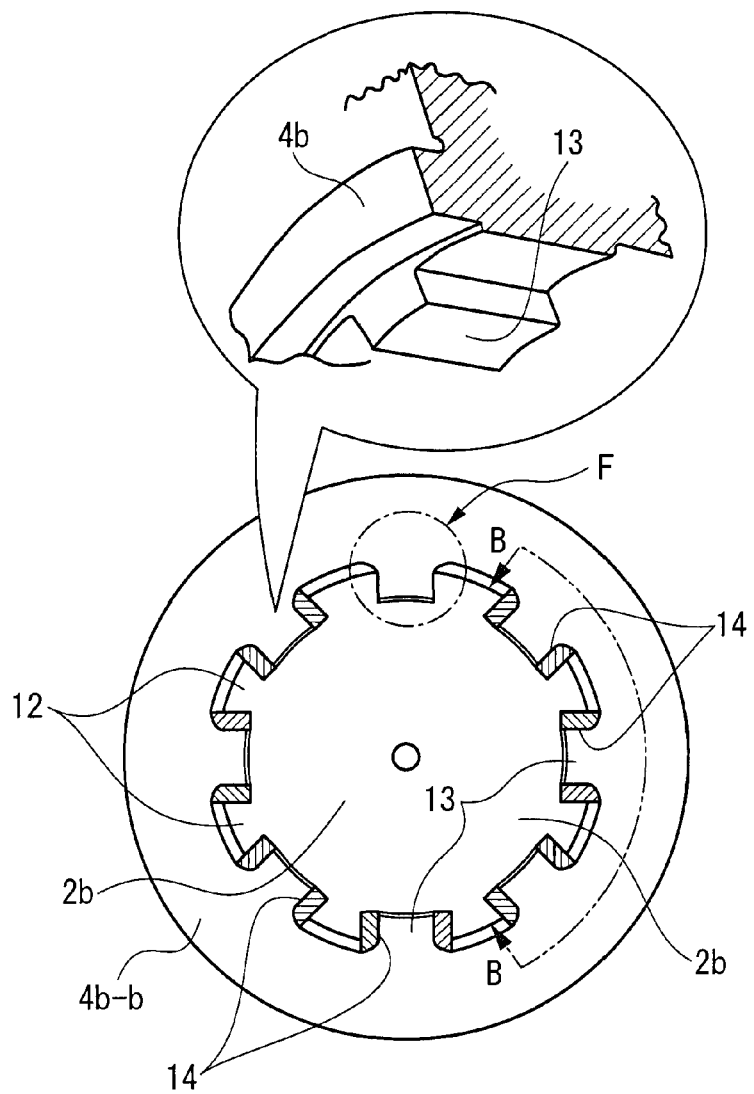
FIG. 3 is a sectional view taken on line A-A in FIG. 2.
Figure 4:
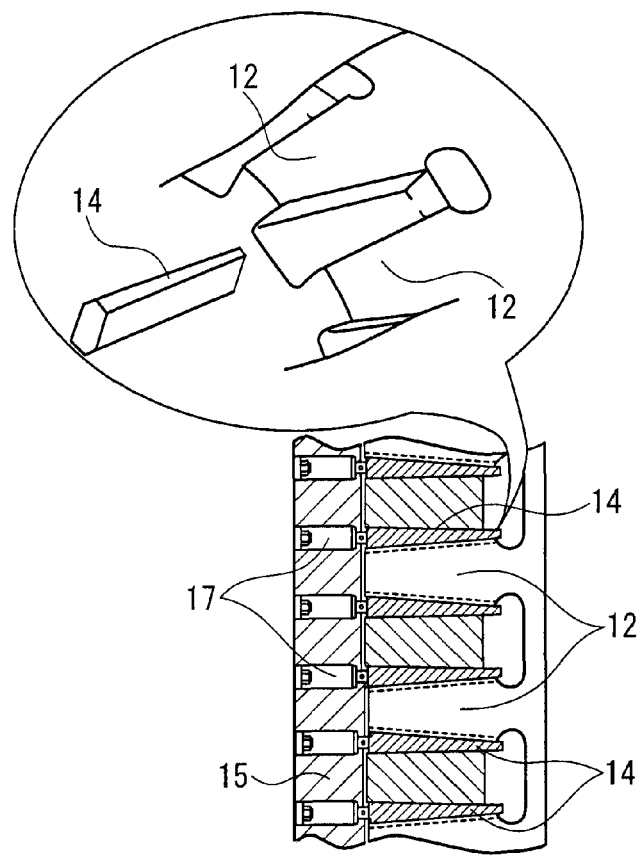
FIG. 4 is a sectional view taken on line B-B in FIG. 3.

FIG. 1 is a sectional view of a rotor and a coupling showing Embodiment 1 of the present invention. FIG. 2 is an enlarged sectional view of a coupling portion in FIG. 1. FIG. 3 is a sectional view taken on line A-A in FIG. 2. FIG. 4 is a sectional view taken on line B-B in FIG. 3.

As shown in FIG. 1, 360° circular (endless) gas seals (called mechanical seals) 3 are detachably (removably) installed at casing penetrating shafts 2 in right and left portions of a rotor (rotating shaft) 1.

A rotor coupling 4 is mounted at the shaft end of one of the casing penetrating shafts 2. One end of a rotor 5 (see FIG. 2) is coupled to the same shaft by a bolt 7 via a spacer 6 (not absolutely necessary) through the intermediary of a coupling flange 4a of the rotor coupling 4. The rotor couplings 4 may be provided on both of the casing penetrating shafts 2 (i.e., at opposite end portions of the rotor 1).

The rotor coupling 4 is composed of a hydraulic detachable coupling. That is, as shown in FIG. 2, the shaft end of the casing penetrating shaft 2 is constituted of a taper shaft portion 2a of a tapered form having a slightly smaller diameter than that of the casing penetrating shaft 2, and a straight shaft portion 2b connected to the leading end of the taper shaft portion 2a. A taper hole portion (interference fit portion) 4b-a, which is formed on the inner peripheral surface of a coupling sleeve 4b of the rotor coupling 4 in correspondence with the taper shaft portion 2a, is detachably mounted on the outer peripheral surface of the taper shaft portion 2a by an interference fit attributed to a hydraulic pressure.

In detail, a spiral groove 8 is formed on the outer peripheral surface of the taper shaft portion 2a, and the spiral groove 8 is supplied with a pressure oil from the end surface side of the straight shaft portion 2b via hydraulic paths 9a, 9b during mounting and removal of the rotor coupling 4. In FIG. 2, 10a and 10b denote O rings which are located on both sides of the spiral groove 8 and are provided on the outer peripheral surface of the taper shaft portion 2a and on the circumferential surface of the taper hole portion 4b-a. The numeral 11 denotes a residual oil blowing hole formed in the coupling sleeve 4b in order to recover the pressure oil after mounting or removal of the rotor coupling 4.

In the present embodiment, the straight shaft portion 2b, and a straight hole portion (engagement portion) 4b-b of the coupling sleeve 4b formed in correspondence there with establish a structure in which teeth 12 and 13 formed therein engage each other.

As shown in FIGS. 3 and 4, the teeth 12 formed in the straight shaft portion 2b are formed with a fanning cross section, and the teeth 13 formed in the straight hole portion 4b-b are formed with a rectangular cross section. In each portion of their engagement, taper spacers 14 having a cone angle close to the angle of friction are interposed on both sides of each tooth, except at one location where the straight shaft portion 2b and the straight hole portion 4b-b mesh with high precision without clearance for phase alignment during mounting of the rotor coupling 4. For this purpose, both side surfaces of the tooth 12 formed in the straight shaft portion 2b are formed as taper surfaces corresponding to the taper spacers 14.

In FIG. 2, the numeral 15 denotes an annular press plate (slipping-off preventing means) which is secured by a clamping bolt 16 to the end surface of the straight shaft portion 2b of the casing penetrating shaft 2 in order to prevent the rotor coupling 4 from slipping off after the rotor coupling 4 is mounted. The numeral 17 denotes a spacer hold-down screw which is screwed into the press plate 15 in order to push in the taper spacer 14.

Because of the above configuration, when a pressure oil is supplied from a hydraulic pressure supply source (not shown) to the spiral groove 8 of the taper shaft portion 2a via the hydraulic paths 9a, 9b, with most of the coupling sleeve 4b of the rotor coupling 4 being loosely fitted on the taper shaft portion 2a and the straight shaft portion 2b of the casing penetrating shaft 2, the diameter of the coupling sleeve 4b (taper hole portion 4b-a) is increased by the hydraulic pressure.

When, in this state, the rotor coupling 4 is pushed in by a suitable means, the coupling sleeve 4b (taper hole portion 4b-a) is fitted deeply (to a maximum) on the taper shaft portion 2a. Then, the supply of the pressure oil is stopped and, at the same time, the hydraulic paths 9a, 9b are switched to a drain side to discharge the pressure oil. By so doing, the coupling sleeve 4b (taper hole portion 4b-a) is interference-fitted on the taper shaft portion 2a. At the time of discharge of the pressure oil, pressurized air is blown in through the residual oil blowing hole 11 to discharge the residual oil.

On this occasion, at the straight shaft portion 2b of the casing penetrating shaft 2 and the straight hole portion 4b-b of the coupling sleeve 4b, their teeth 12 and 13 engage in the circumferential direction, with the taper spacers 14 being interposed therebetween. For this engagement, phase alignment is carried out at the one location, i.e., an engagement portion F where high accuracy engagement takes place without clearance.

After the rotor coupling 4 is interference-fitted, the press plate 15, which engages the rotor coupling 4 in a slipping-off preventing direction, is clamped by the bolt 16 onto the end surface of the straight shaft portion 2b of the casing penetrating shaft 2. By so doing, the interference-fitted state of the rotor coupling 4 is maintained. Moreover, the taper spacer 14 is pushed in deeply by the spacer hold-down screw 16 which is screwed into the press plate 15. Then, one end of the rotor 5 is coupled to the coupling flange 4a of the rotor coupling 4 by the bolt 7 via the spacer 6.

On the other hand, with the press plate 15 being detached along with the spacer hold-down screw 16, the pressure oil is supplied again from the hydraulic pressure supply source (not shown) to the spiral groove 8 of the taper shaft portion 2a via the hydraulic paths 9a, 9b. As a result, the diameter of the coupling sleeve 4b (taper hole portion 4b-a) is increased by the hydraulic pressure, whereby the interference-fitted state of the coupling sleeve 4b (taper hole portion 4b-a) is released.

Then, simply upon supply of the hydraulic pressure, the rotor coupling 4 is easily disengaged, together with the taper spacers 14, from the casing penetrating shaft 2, for example, by pulling the rotor coupling 4. Thus, the gas seals 3 can be disengaged from the casing penetrating shaft 2 for replacement and maintenance.

In the present embodiment, while the rotor 1 is rotating, the rotor coupling 4 deals with rated torque (normal torque) by use of frictional torque at the interference fit portion between the taper shaft portion 2a of the casing penetrating shaft 2 and the coupling sleeve 4b (taper hole portion 4b-a) under the hydraulic pressure, and deals with abnormal torque, such as one during short-circuiting of the electrical generator, by utilizing the portion of engagement between the teeth 12 and 13 of the straight shaft portion 2b of the casing penetrating shaft 2 and the straight hole portion 4b-b of the coupling sleeve 4b.

Thus, in the rotor coupling 4, the interference fit portion due to the hydraulic pressure has an interference margin sufficient for the rotor 1 and the rotor coupling 4 to act as a single elastic body in response to the lateral vibration of the shaft, so that stable shaft vibration characteristics are obtained. A steam turbine and a gas turbine generally rotate at a high speed and, in order for them to be kept with minimal vibration, their axes have to be held in position relative to each other at the portion of coupling between the adjacent rotors, and this state has to be stably maintained. In the present embodiment, the interference fit portion is subject to fitting of the taper surfaces, and thus functions effectively.

In response to abnormal torque, such as that in the short-circuiting accident of an electric generator, which is considered to occur several times or less frequently during the total life of the steam or gas turbine, the portion of engagement between the teeth 12 and 13 resists the marked slip of the rotor coupling 4, and this is capable of preventing damage which makes the continued use of the rotor 1 difficult. On this occasion, the portion of engagement between the teeth 12 and 13 is brought into engagement by the taper spacers 14 without play. Thus, all the teeth can be simultaneously resistant during abnormal torque.

Furthermore, of the portions of engagement between the teeth 12 and 13, only one engagement portion F undergoes high accuracy engagement without clearance. Therefore, an indexing mechanism as in a gear cutting machine is not required. Even if the rotor 1 has a considerably long shaft, it can be processed easily by an ordinary processing machine. In other words, the introduction of equipment, which is expensive, but is used with a low frequency, can be avoided. This is very advantageous in the cost of production.

The reasons why the taper spacers 14 are disposed at positions on both sides of the tooth at the portion of engagement between the teeth 12 and 13 are as follows: Abnormal torque in a short circuit of the electrical generator as an accident appears as a positive-negative alternate load, which has to be coped with by such disposition. Also, accidental detachment has to be prevented under an abnormally heavy load. Moreover, when the taper spacers 14 are mounted, their thickness adjustment is easy to make because no play is present. When the taper spacers 14 are dismounted, they are easy to withdraw. To fulfill all of these requirements, it is preferred to adopt an angle close to the angle of friction as the inclination of the spacer.

Embodiment 2

Figure 5:
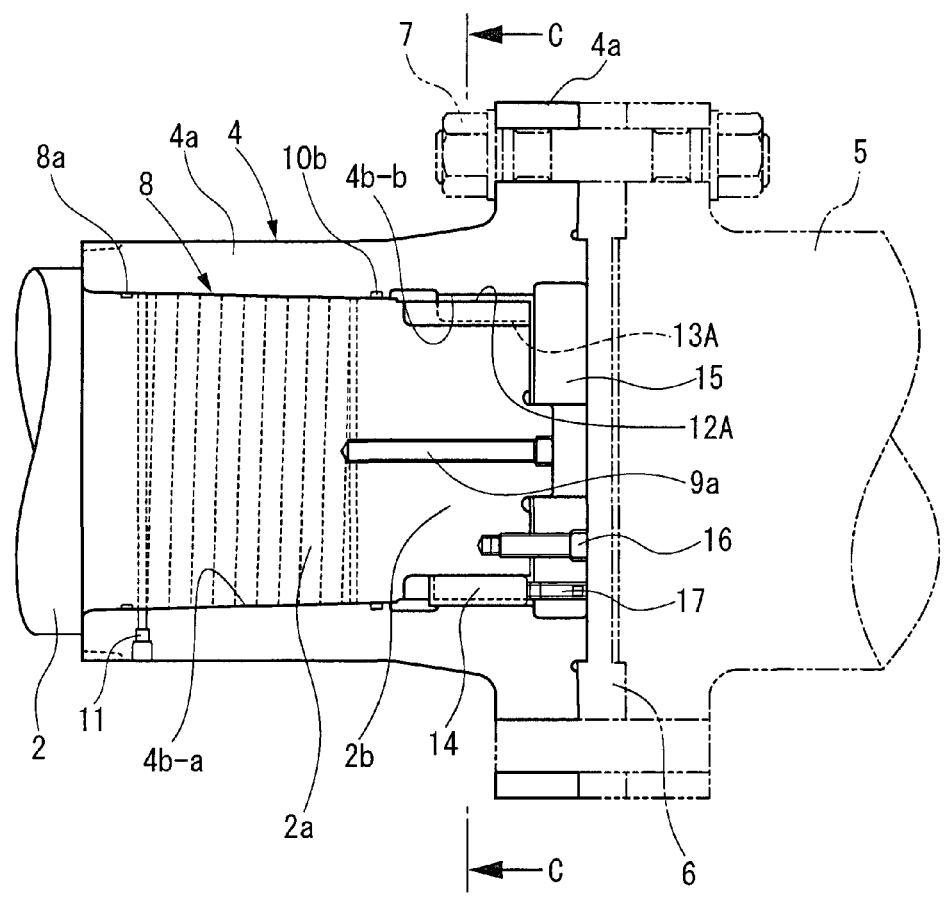
FIG. 5 is a sectional view of a coupling portion showing Embodiment 2 of the present invention.
Figure 6:
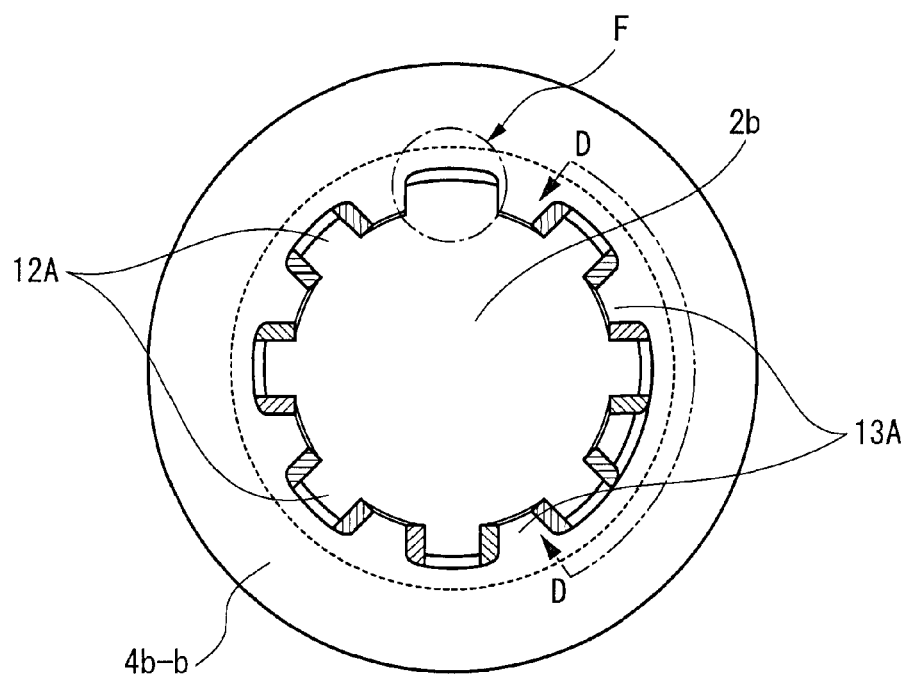
FIG. 6 is a sectional view taken on line C-C in FIG. 5.
Figure 7:
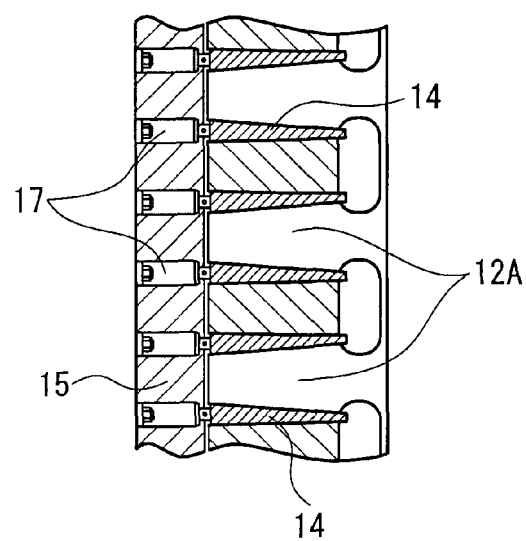
FIG. 7 is a sectional view taken on line D-D in FIG. 6.

FIG. 5 is a sectional view of a coupling portion showing Embodiment 2 of the present invention. FIG. 6 is a sectional view taken on line C-C in FIG. 5. FIG. 7 is a sectional view taken on line D-D in FIG. 6.

This is an embodiment in which at the portions of engagement between the teeth 12A and 13A in Embodiment 1, the teeth 12A formed in the straight shaft portion 2b are changed from a fanning cross sectional shape to a rectangular cross sectional shape. Other features are the same as those in Embodiment 1. Thus, the same members as those in FIGS. 2 to 4 are assigned the same numerals as in these drawings, and duplicate explanations are omitted.

According to this embodiment, the advantage that the strength of the teeth 12A formed in the straight shaft portion 2b can be enhanced is obtained, in addition to the same actions and effects as those in Embodiment 1.

Embodiment 3

Figure 8:
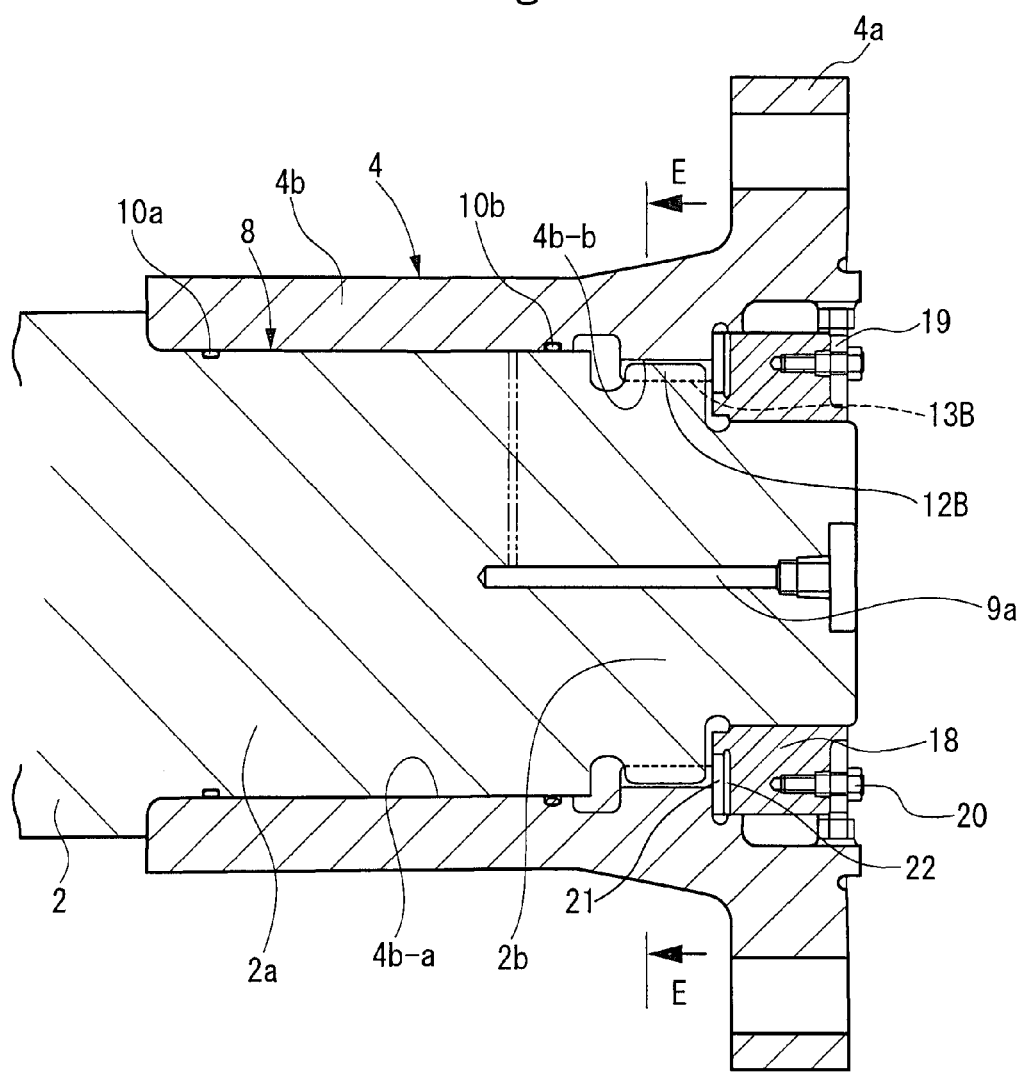
FIG. 8 is a sectional view of a coupling portion showing Embodiment 3 of the present invention.
Figure 9:
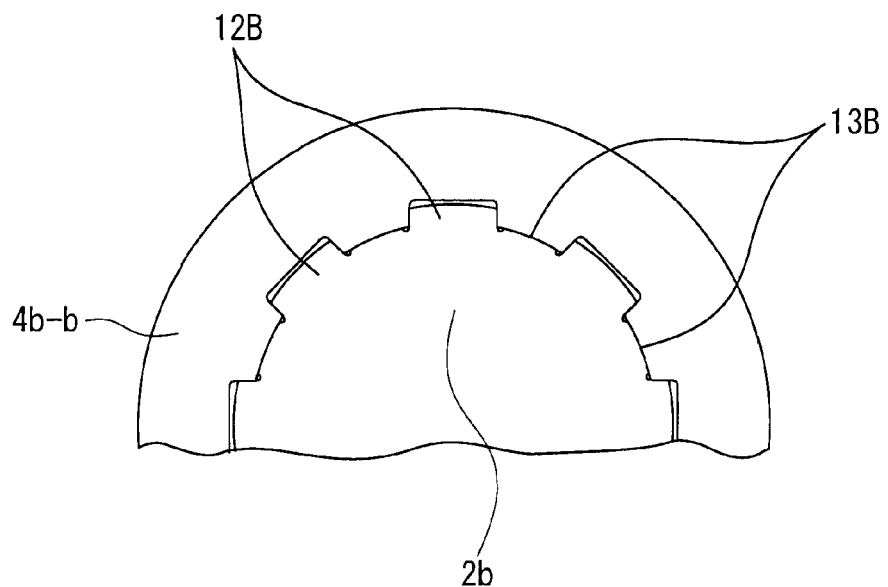
FIG. 9 is a sectional view taken on line E-E in FIG. 8.

FIG. 8 is a sectional view of a coupling portion showing Embodiment 3 of the present invention. FIG. 9 is a sectional view taken on line E-E in FIG. 8.

This is an embodiment in which at the portions of engagement between the teeth 12B and 13B in Embodiment 1, the teeth 12B formed in the straight shaft portion 2b and the teeth 13B formed in the straight hole portion 4b-b are engaged with each other, without using the taper spacers 14, after processing by an ordinary processing machine such as a lathe, and then performing polishing. In this case, it cannot be expected for all the teeth to resist abnormal torque simultaneously. However, because of the ductility of the rotor 1 and the rotor coupling 4 comprising an alloy steel, the load is borne, first of all, by the tooth having a little play, sequentially by the tooth having more play, and finally by all the teeth. Thus, no problem is posed.

In this embodiment, moreover, slipping-off of the rotor coupling 4 is prevented by a press nut (slipping-off preventing means) 18 which is screwed to the shaft end of the straight shaft portion 2b, rather than by the press plate 15. In FIG. 8, the numeral 19 denotes a whirl-stop washer which engages the rotor coupling 4 to carry out whirl-stopping of the press nut 18. The whirl-stop washer 19 is secured to the press nut 18 by a bolt 20. The numeral 21 denotes a coned disk spring, and the numeral 22 denotes a liner.

In this embodiment as well, the same actions and effects as those in Embodiment 1 are obtained.

Embodiment 4

Figure 10:
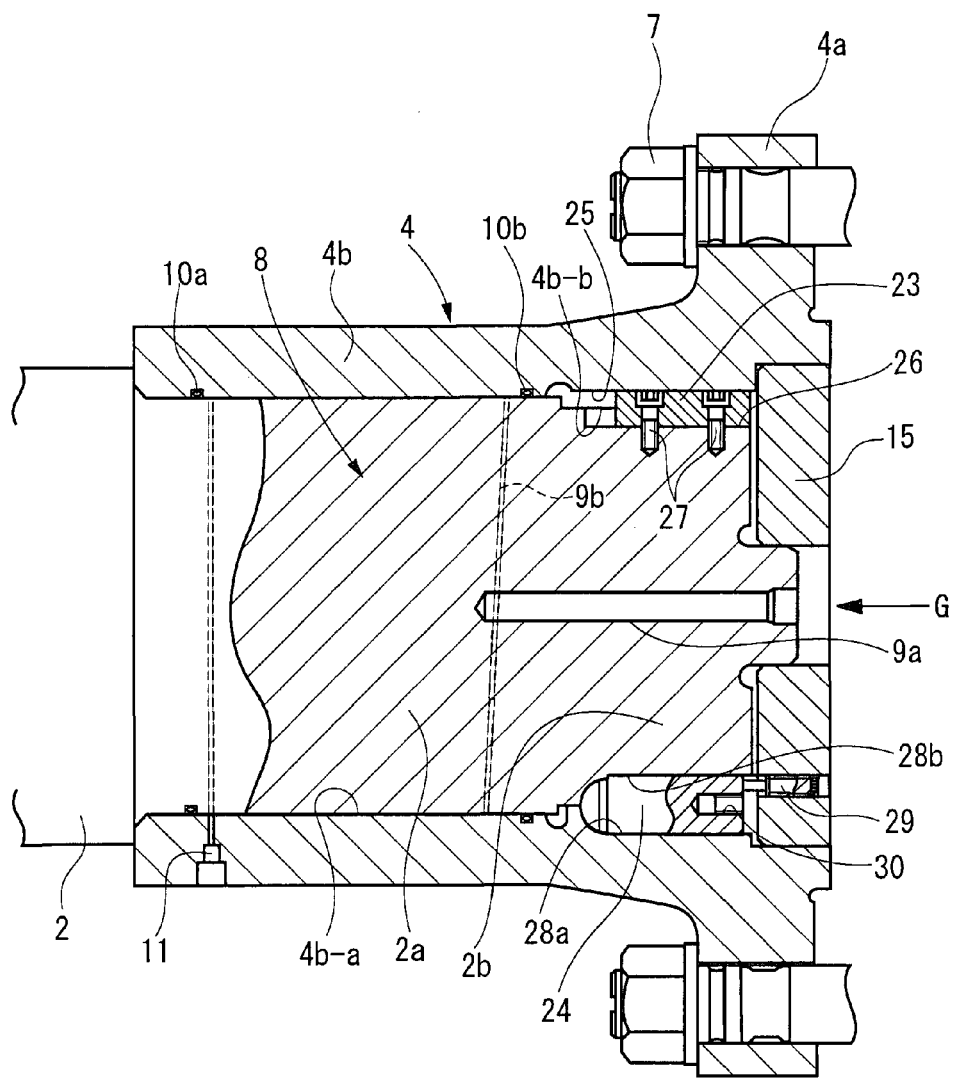
FIG. 10 is a sectional view of a coupling portion showing Embodiment 4 of the present invention.
Figure 11:
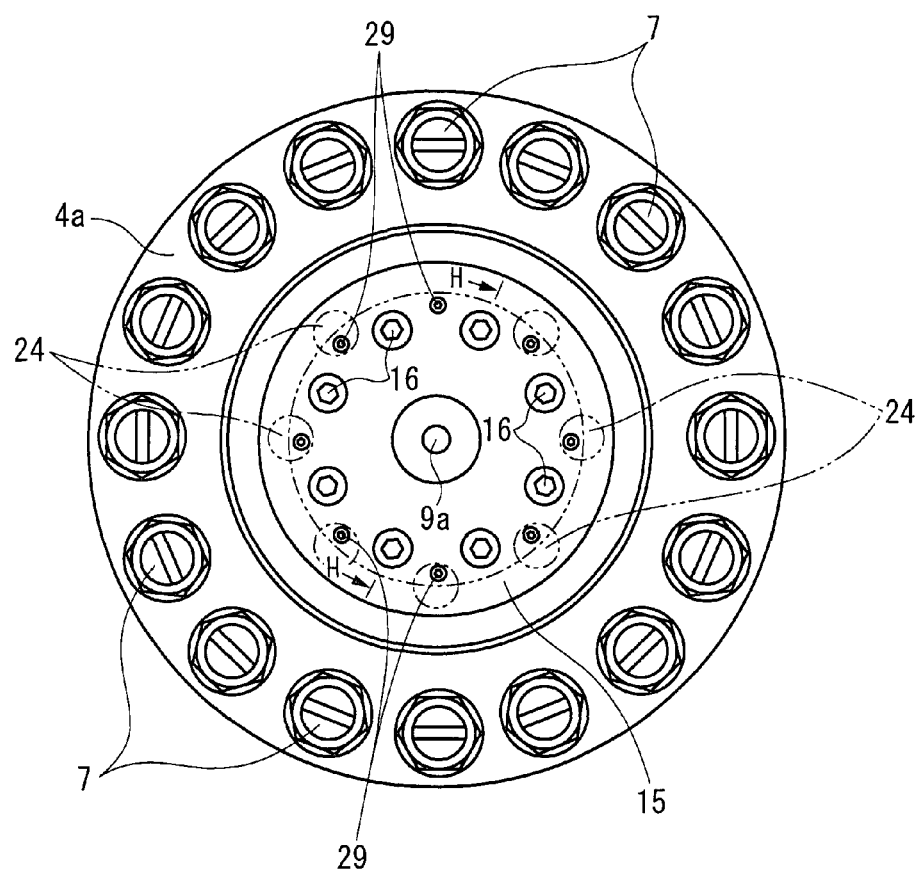
FIG. 11 is a view taken in the direction of an arrowed line G in FIG. 10.
Figure 12:
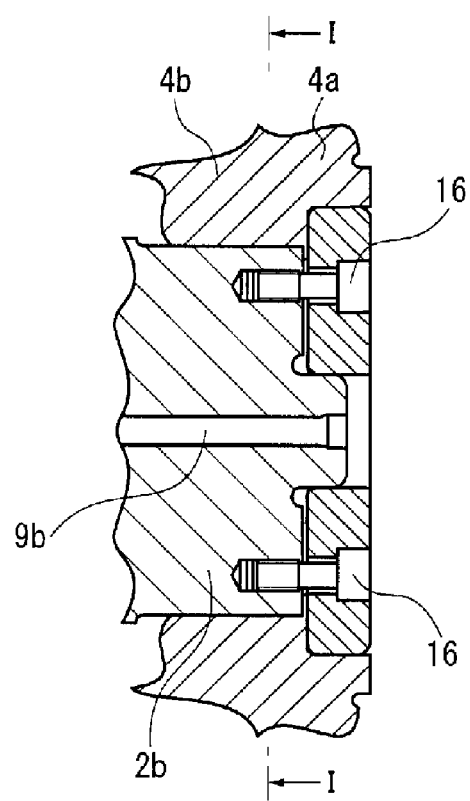
FIG. 12 is a sectional view taken on line H-H in FIG. 11.
Figure 13:
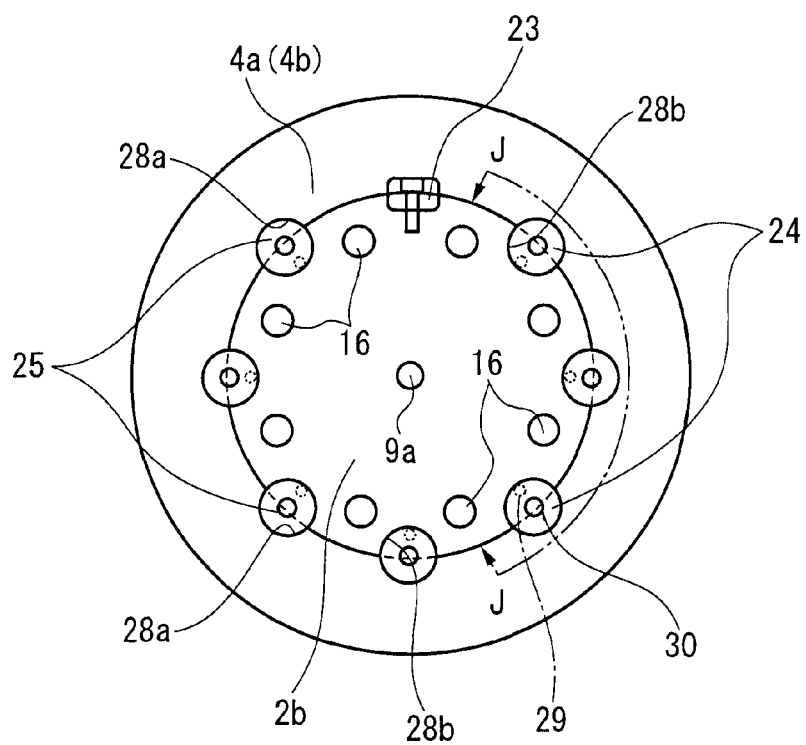
FIG. 13 is a sectional view taken on line I-I in FIG. 12.
Figure 14:
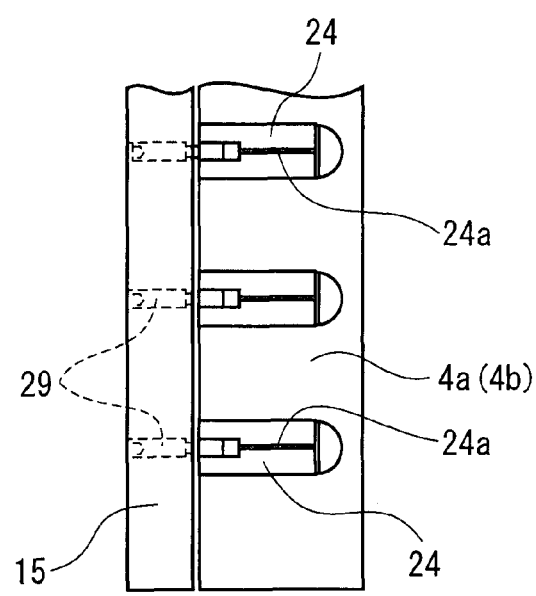
FIG. 14 is a sectional view taken on line J-J in FIG. 13.
Figure 15:
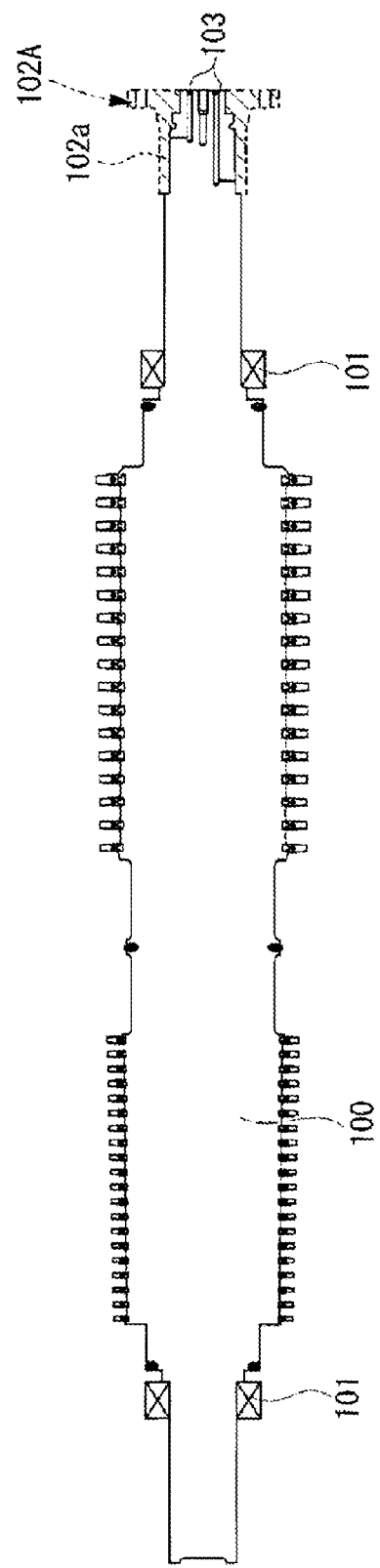
FIG. 15 is a side view of a rotor and a coupling which represent a conventional example.
Figure 16:
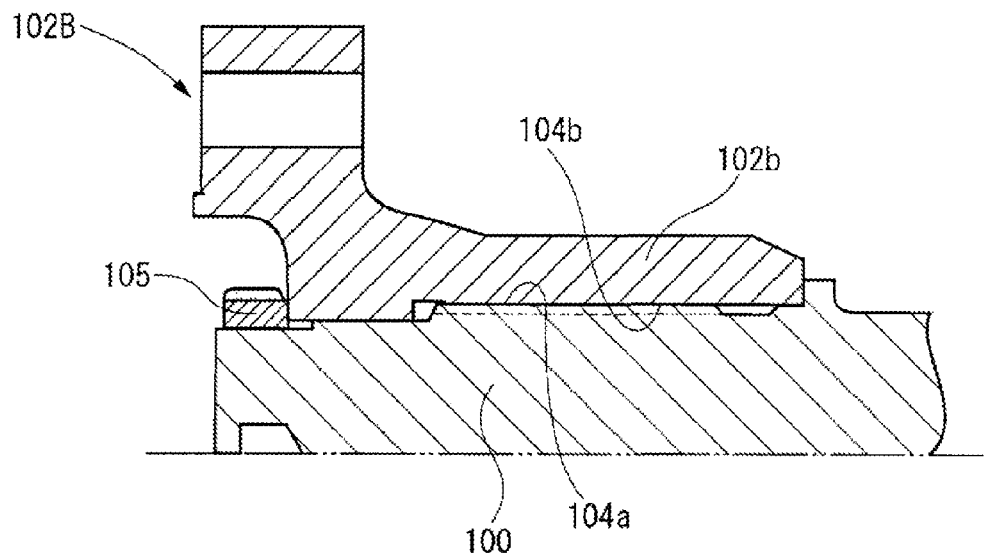
FIG. 16 is a sectional view of another coupling according to the conventional example.

FIG. 10 is a sectional view of a coupling portion showing Embodiment 4 of the present invention. FIG. 11 is a view taken in the direction of an arrowed line G in FIG. 10. FIG. 12 is a sectional view taken on line H-H in FIG. 11. FIG. 13 is a sectional view taken on line I-I in FIG. 12. FIG. 14 is a sectional view taken on line J-J in FIG. 13.

This is an embodiment in which the engagement structure by the teeth 12 and the teeth 13 at the straight shaft portion 2b and the straight hole portion 4b-b in Embodiment 1 is changed to an engagement structure by a square key 23 and round taper keys 24.

That is, at the straight shaft portion 2b and the straight hole portion 4b-b, one of keyways corresponding to each other is formed into grooves 26, 25 of a rectangular cross section into which the square key 23 is inserted, while the other seven keyways corresponding to each other are formed into taper grooves 28a, 28b of a semicircular cross section into which the round taper keys 24 are inserted (see FIGS. 10 and 13).

Here, the grooves 26 and 25 of a rectangular cross section are machined before the rotor coupling 4 (strictly, the taper hole portion 4b-a of the coupling sleeve 4b) is mounted on the casing penetrating shaft 2 (strictly, the taper shaft portion 2a) by interference fit under the hydraulic pressure. After the square key 23 is mounted in the groove 26 of the rectangular cross section on the side of the casing penetrating shaft 2 (strictly, straight shaft portion 2b) by bolts 27, the rotor coupling 4 is axially plunged and pressed in, with the square key 23 serving as a guide for phase alignment. On the other hand, after the rotor coupling 4 is mounted on the casing penetrating shaft 2 by the interference fit under the hydraulic pressure, the taper grooves 28a, 28b of the semicircular cross section are formed by co-machining of the rotor coupling 4 and the casing penetrating shaft 2. Then, the round taper keys 24 are inserted into taper grooves of a circular cross section which are formed from the taper grooves 28a and 28b of the semicircular cross section.

In FIG. 10, the numeral 29 denotes a round taper key hold-down screw which is screwed into the press plate 15 to hold down the round taper key 24, and the numeral 9a denotes a screw hole for connection of a pressure oil supply pipe. In FIG. 14, the numeral 24a denotes an air vent passage for use during insertion of the round taper key 24. The screw hole 30 is used also in separately screwing a bolt into it and pulling out the bolt when the round taper key 24 is to be detached. Other features are the same as those in Embodiment 1. Thus, the same members as those in FIG. 2 are assigned the same numerals as in this drawing, and duplicate explanations are omitted.

According to the present embodiment, while the rotor is rotating, the rotor coupling 4 can deal with rated (normal) torque by use of frictional torque at the interference fit portion between the taper shaft portion 2a of the casing penetrating shaft 2 and the coupling sleeve 4b (taper hole portion 4b-a) under the hydraulic pressure, and can deal with abnormal torque, such as one during short-circuiting of the electrical generator, by utilizing the engagement structure attributed to the square key 23 and the round taper keys 24 at the straight shaft portion 2b of the casing penetrating shaft 2 and the straight hole portion 4b-b of the coupling sleeve 4b. The same actions and effects as those in Embodiment 1 are obtained.

INDUSTRIAL APPLICABILITY

The hydraulic detachable coupling according to the present invention is preferred for use in coupling the rotors of a rotating machine coaxially.

The invention claimed is:

1. A hydraulic detachable coupling mounted detachably on a rotating shaft of a rotating machine, comprising a coupling sleeve which is fitted on a shaft end portion of the rotating shaft, the coupling sleeve including:
    an interference fit portion which is interference-fitted on an outer peripheral surface of the shaft end portion by a hydraulic pressure; and
    an engagement portion which engages the outer peripheral surface of the shaft end portion at a plurality of locations in a circumferential direction, wherein
    the interference fit portion and the engagement portion are located adjacent to each other,
    the engagement portion is a straight hole portion having teeth formed therein, the teeth engaging teeth formed in a straight shaft portion of the shaft end portion,
    the teeth of the engagement portion, except for one of the teeth of the engagement portion, engage a plurality of the teeth of the shaft end portion via taper spacers disposed on both sides of other of the teeth of the engagement portion,
    wherein the one of the teeth of the engagement portion engages with one of the teeth of the shaft end portion without using the taper spacers and without having any clearance.

2. The hydraulic detachable coupling according to claim 1, wherein the interference fit portion is a taper hole portion corresponding to a tapering-off taper shaft portion of the shaft end portion.

3. The hydraulic detachable coupling according to claim 1, wherein the coupling sleeve is prevented from slipping off the rotating shaft, by slipping-off preventing means secured to the shaft end portion.

* * * * *